United States Patent [19]

Kishi et al.

[11] 4,124,296

[45] Nov. 7, 1978

[54] ORIGINAL URGING DEVICE

[75] Inventors: Hirotoshi Kishi, Tokyo; Masao Ariga, Kawasaki; Hiroyuki Hattori, Inagi; Yoshiki Furukawa, Yokohama; Hiroshi Ogawa, Kawasaki; Takahiko Amanuma, Tokyo; Kazumi Umezawa; Seiji Sagara, both of Kawasaki, all of Japan

[73] Assignee: Canon Kabushiki Kaisha, Tokyo, Japan

[21] Appl. No.: 827,020

[22] Filed: Aug. 23, 1977

[30] Foreign Application Priority Data

Sep. 1, 1976 [JP] Japan .................... 51-104638

[51] Int. Cl.² .................... G03B 27/62; E05F 1/12
[52] U.S. Cl. .................... 355/75; 16/190
[58] Field of Search .................... 355/72, 74, 75, 76, 355/82, 93, 128; 16/190

[56] References Cited

U.S. PATENT DOCUMENTS

| 829,385 | 8/1906 | Brennan | 16/190 UX |
|---|---|---|---|
| 2,638,621 | 5/1953 | Burke | 16/190 X |
| 3,615,134 | 10/1971 | Newcomb | 355/75 |
| 3,642,376 | 2/1972 | Halvorsen et al. | 355/82 X |
| 3,724,949 | 4/1973 | Kanno et al. | 355/75 |

FOREIGN PATENT DOCUMENTS 2,447,472  4/1975  Fed. Rep. of Germany ............. 355/75

Primary Examiner—Donald A. Griffin
Attorney, Agent, or Firm—Fitzpatrick, Cella, Harper & Scinto

[57] ABSTRACT

This specification discloses an original urging device for enabling an original to be well placed and supported on the original supporting carriage of a copying machine, a printing machine or the like. The supporting member for the original urging plate of the device has one end thereof pivotally supported. A point for taking the resilient force of a resilient member is provided at a point on the supporting member. During replacement of the original, the original urging plate may be made stationary within a predetermined range of angles facilitating the handling of the urging plate, in accordance with the rotated position of the supporting member and by the relationship between the moment produced by the gravity force acting to the supporting member and urging plate and the moment produced by the resilient force of the resilient member.

5 Claims, 15 Drawing Figures

ORIGINAL URGING DEVICE

BACKGROUND OF THE INVENTION

1. Field of the Invention

This invention relates to an original urging device for supporting an original resting on the original supporting carriage of a copying machine, a printing machine or the like. More particularly, the invention relates to an original urging device which is capable of fixedly holding down not only sheet originals but also three-dimensional originals on the original supporting carriage and which may be stationary within a predetermined range of angles to facilitate the handling of the original urging plate during placement of originals.

2. Description of the Prior Art

For example, electrophotographic copying machines or the like have heretofore employed original urging plates for fixing originals to be copied on transparent original supporting carriages such as glass plates or the like. Some of these conventional original urging plates will hereinafter be described by reference to FIGS. 1 to 6.

Figure 1:
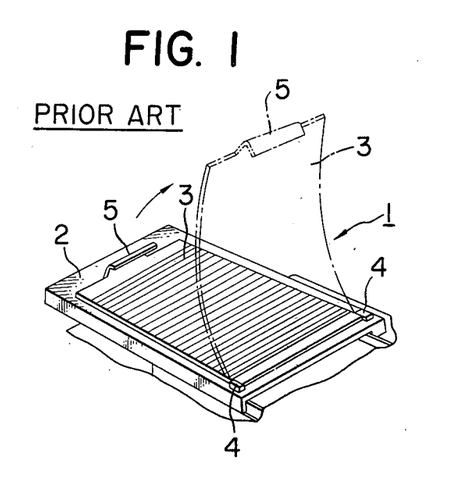
FIGS. 1 and 2 are perspective views showing examples of the original urging plate according to the prior art.

FIG. 1 of the accompanying drawings is a perspective view showing an original urging device 1 which is of a simple construction. Designated by 2 is a frame supporting a glass plate (not shown) on which an original may rest, and 3 an original urging plate having a sufficient area to cover the whole surface of the glass plate and formed of rubber or similar material. At one end, the urging plate 3 has its opposite side edges secured to a portion of the frame 2 by means of hinges 4. At the other end, the urging plate 3 is provided with a handle 5 which may be raised in the direction of the arrow to permit placement of an original with the handle left in that position. The original urging device as shown in FIG. 1 is very simple in construction and requires only a few parts and thus, a low cost of manufacture. On the other hand, however, such urging device suffers from inconveniences in operability. When an original is to be placed, one must raise the original urging device by gripping the handle in one's right hand while placing the original by using one's left hand. Such use of both hands to effect placement of an original is inconvenient to the operator of the copying machine or the like. Also, the urging plate, which is entirely formed only of a flexible member, compels the operator to resort to his hands to uniformly hold down the urging plate against the glass plate during copying of a book or other three-dimensional original, and also requires the manual forces of the operator himself, thus raising a problem in terms of operability. A device which has overcome the problems peculiar to the original urging device as shown in FIG. 1 is shown in FIGS. 2 to 4.

Figure 2:
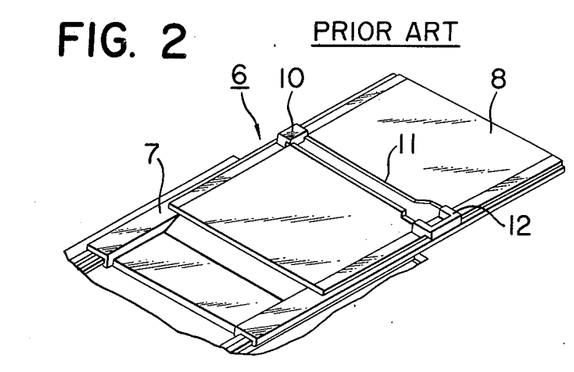
Figure 3:
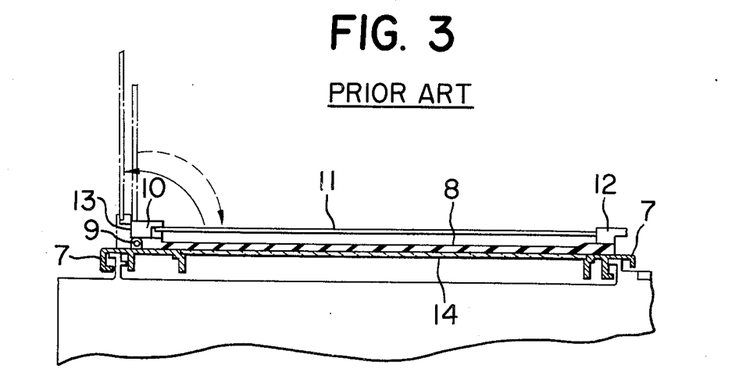
FIGS. 3 and 4 are cross-sectional views of the FIG. 2 plate.
Figure 4:
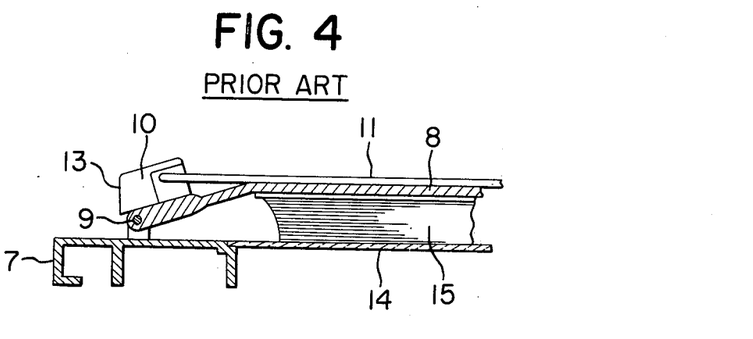

FIG. 2 is a perspective view of the urging device, FIG. 3 is a transverse sectional view taken along the center of the FIG. 2 device, and FIG. 4 is an enlarged, fragmentary, cross-sectional view of the mounting portion of the FIG. 2 device. In the original urging device 6 of FIG. 2, a frame 7 supports an original supporting glass plate (not shown) in the center portion thereof. An original urging plate 8 has one end thereof secured to a portion of the frame 7 by means of hinges 9 (See FIGS. 3 and 4), and is pivotable about the hinges 9. Supporting rods 11 extend from a block 10 integrally formed with the urging plate 8, and each rod 11 has one end loosely embedded in a handle 12 secured to the other side edge of the urging plate 8.

Reference will now be had to FIGS. 3 and 4 to describe the manner in which an original is urged. The original urging plate 8, which has one end thereof pivotally secured to the frame 7 by means of hinges 9, as mentioned above, may be raised in the direction of the full-line arrow by gripping the handle 12. When opened beyond 90°, the urging plate 8 tends to fall from gravity in the opposite direction, but the back 13 of the block 10 bears against the upper surface of the frame 7 to restrict any further rotation of the plate 8 and enables the plate 8 to remain in that position (indicated by dot-and-dash line) even if the handle 12 is released. In such position, the operator may use both hands to place an original on a glass plate 14. When having placed the original, the operator may again grip the handle 12 to return the urging plate in the direction of the broken-line arrow, thus completing the placement of the original. In the urging device now under discussion, the supporting rods 11 tend to maintain the urging plate 8 horizontal so that the plate 8 can uniformly hold down the original. Further, during the copying of a three-dimensional original, which may be even a thick book 15 as shown in FIG. 4, the urging plate 8 may bend in the form of "∧" so that the book 15 can be urged against the glass plate 14. In the urging device of FIG. 2, as described above, the urging plate 8 remains open and stationary, so that the operator can use both hands for placement of an original, and this means greater ease of operation than the urging plate of the type shown in FIG. 1. However, depending on the expense of the urging plate 8, it would be impossible for some operators when operating the urging plate 8, to reach the handle 12 to raise it until the stationary position of the urging plate 8 is reached. Also, the urging plate 8 cannot be made stationary unless it is raised always beyond 90°, and such poor operability would offer problems.

Figure 5:
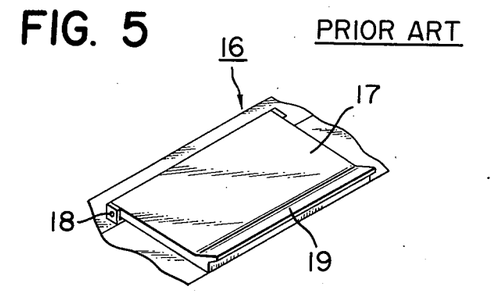
FIG. 5 is a perspective view showing another example of the urging plate according to the prior art.
Figure 6:
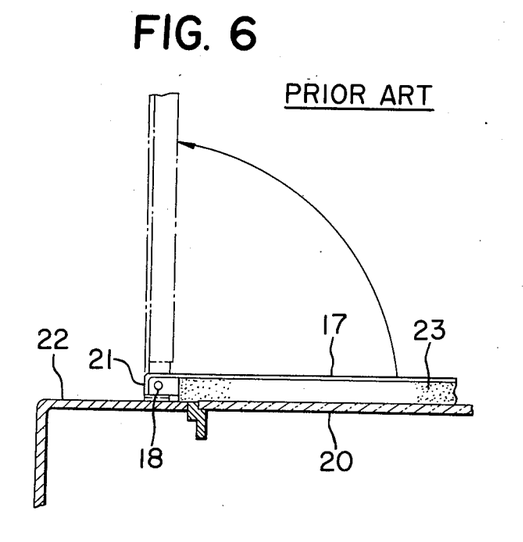
FIG. 6 is a cross-sectional view of the FIG. 5 plate.

Another example of the original urging device similar to that of FIG. 2 will be considered by reference to FIGS. 5 and 6. FIG. 5 is a perspective view of the urging device 16, and FIG. 6 is an enlarged, fragmentary sectional view of the mounting portion thereof with respect to the apparatus. In FIG. 5, an original urging plate 17 formed of non-flexible material has one end thereof pivotally secured to the apparatus body by means of hinges 18, and has the other end provided with a handle 19. Placement of an original by this urging device 16 may be accomplished by gripping and raising the handle 19 of the urging plate 27 in the direction of the arrow, as shown in FIG. 6. If the urging plate 17 is located beyond 90°, it tends to fall from gravity in the opposite direction from a glass plate 20 as in the previously described urging device, but the back 21 of the urging plate bears against the side wall of the apparatus body and the plate becomes stationary in this position. In such position, an original may be placed on the glass plate 20, and then the urging plate 17 may be returned to its initial position, whereupon the original may be urged against the glass plate by a cushion member 23 provided inwardly of the urging plate 17. The cushion member 23 is formed of porous material such as foamed urethane or the like and thus, slightly thick originals may be placed on this urging plate, although the thickness of the originals is in a limited range. Again in the urging device 16, the urging plate 17 cannot be made stationary unless it is raised always beyond 90°, and this poor operability offers problems.

Also known is an original urging device disclosed in our previous U.S. Pat. No. 3,994,582. In this device, the urging plate can be maintained open at an angle within 90°, but this is only possible within a predetermined angle. Thus, even for this device, the urging plate must be opened to the predetermined angle and this involves an extra operation. In addition, the height of the operator is not taken into account and the necessity of raising the urging plate to the predetermined angle also offers problems in operabitlity.

SUMMARY OF THE INVENTION

It is an object of the present invention to provide an original urging device which enables an original to be well supported on the original supporting carriage of a copying machine, a printing machine or the like.

It is another object of the present invention to provide an original urging device which can be stationary within a predetermined range of angles facilitating the handling of the urging plate.

It is still another object of the present invention to provide an original urging device which is capable of holding down not only sheet-like originals but even three-dimensional originals with a uniform pressure force.

It is yet still another object of the present invention to provide an original urging device which permits not only the gravity of the urging plate but also the resilient force of a resilient member to act on the surface of an original when it is held down.

It is a further object of the present invention to provide an original urging device which is vertically movable substantialy parallel to the original carriage.

It is a further object of the present invention to provide an original urging device which is detachable from the apparatus body.

Thus, the present invention improves the operability with which an original is placed on or removed from the original supporting carriage of a copying machine, a printing machine or the like.

With the original urging device of the present invention, it is possible to provide a condition in which the urging plate urges an original, and a condition in which the urging plate is stationary at its raised position for permitting placement of an original, in accordance with the rotated position of the support member for the original urging plate and by the relationship between the moment produced by the gravity force acting to the supporting member and the urging plate and the resilient force of the resilient member. Particularly, according to the present invention, the urging plate can be made stationary at an angle within 90° when it is raised, thus making the device easier to operate.

The invention will become more fully apparent from the following detailed description thereof taken in conjunction with the accompanying drawings.

DESCRIPTION OF THE PREFERRED EMBODIMENTS

The invention will hereinafter be described with respect to some embodiments thereof as applied in a copying machine.

Figure 7:
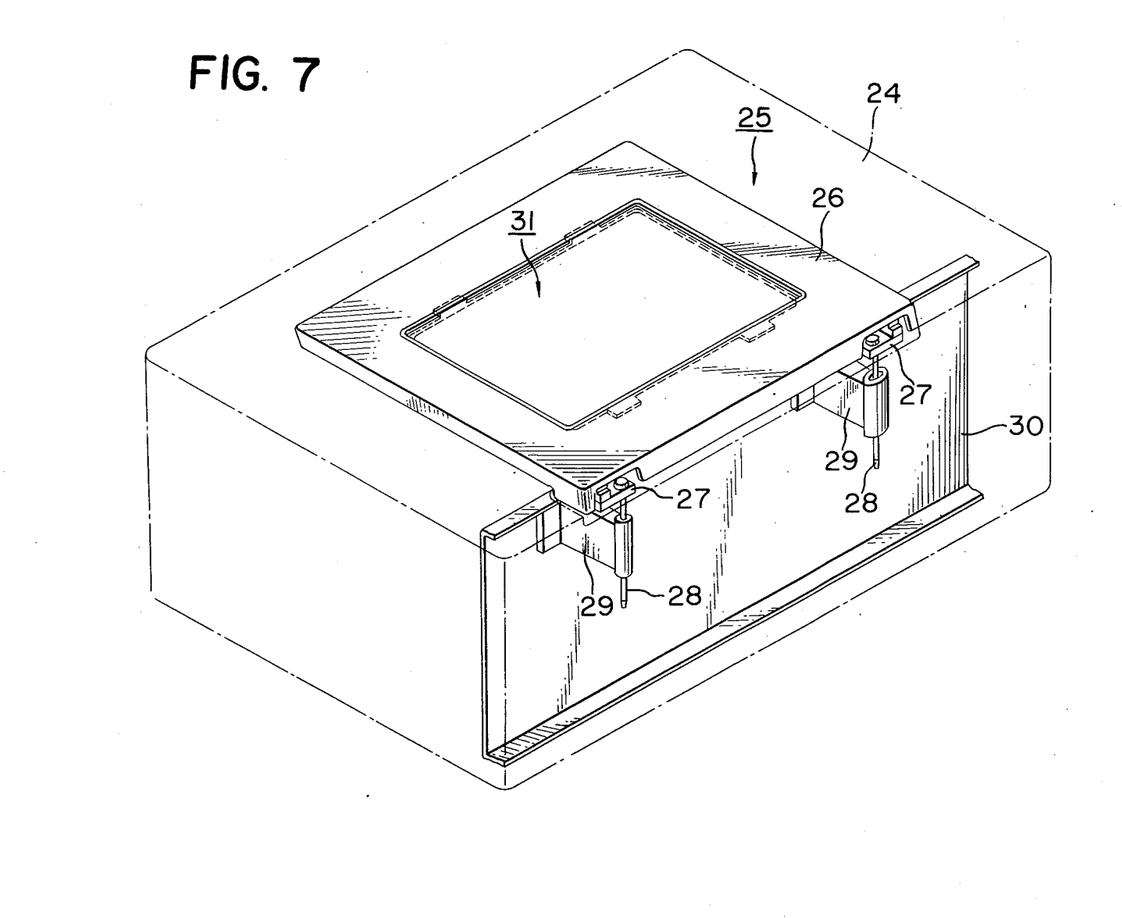
FIG. 7 is a perspective view of the urging plate according to an embodiment of the present invention.

FIG. 7 is a perspective view of the original urging device of the present invention as seen from the rear thereof and showing the device as it holds down a sheet-like original. Designated by 24 is the copying machine body but this need not be described in detail herein. Designated by 25 on top of the body 24 is the original urging device of the present invention which includes an original urging plate 26. The urging plate 26 is pivotally mounted to mounting seats 27 by a mechanism to be described. The mounting seats 27 are secured to the upper ends of struts 28 slidably supported with respect to supporting members 29 which in turn are secured to a structure 30 in the body 24. With the above-described construction, the entire urging plate 26 is slidable with respect to the supporting members 29 to which the struts 28 are secured, and thus floatable with respect to the body 24. As shown, one of the supporting members 29 may be formed with a bore large enough to receive therethrough the strut 28 with some degree of freedom, thus providing an allowance for machining precision. Designated by 31 on top of the original urging plate 26 is an information sheet mounting portion which may comprise a recessed portion 32 formed in the urging plate 26 so that an information sheet 33 containing attachment directions or publicity may be placed at the bottom of the recessed portion 32, and the information sheet may be covered and fixed by a transparent film 34. With this construction, replacement of the information sheet 33 may be effected by removing the transparent film 34. (For the details of the construction, See FIG. 13.)

Operation of the device 25 will now be described. The urging plate 26 may be opened by raising it at the side thereof opposite the mounting portion, and this will further be described by reference to FIGS. 8 to 10 which illustrate the mechanism of the mounting portion.

Figure 8:
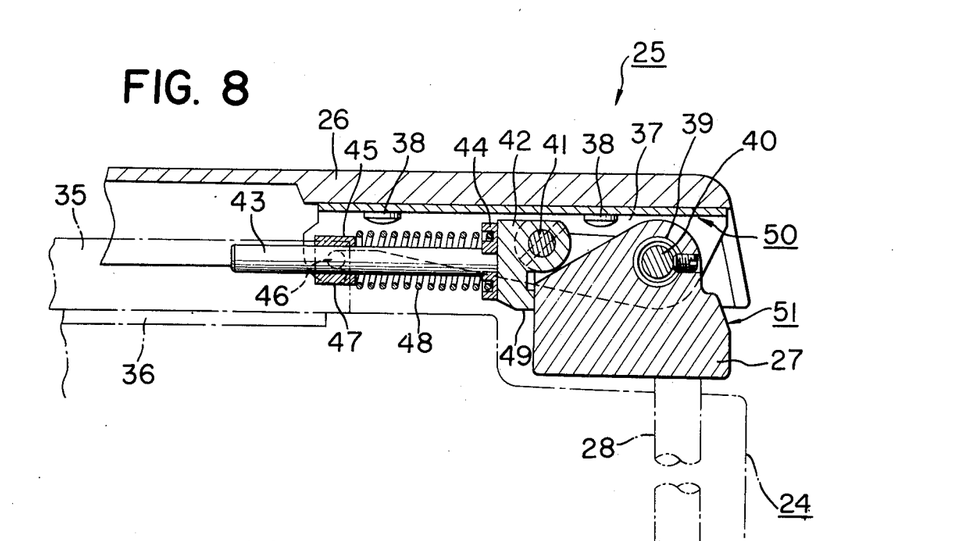
FIGS. 8 and 10 are cross-sectional views of the mounting portion of the FIG. 7 plate.
Figure 9:
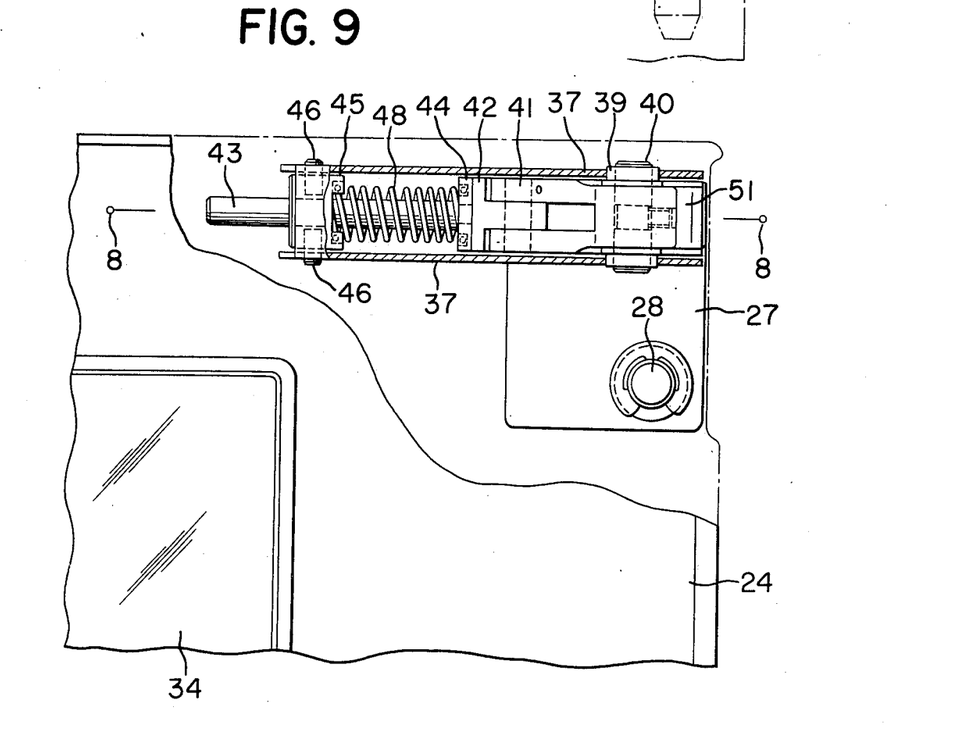
FIG. 9 is a top plan view corresponding to FIG. 8.

FIG. 8 is an enlarged, fragmentary sectional view of the urging device as it is in its position for holding down a sheet-like original. The urging plate 26 of this embodiment has its exterior portion formed of a non-flexible material such as metal, synthetic resin or composite material, and inwardly thereof, a cushion member 35 is integrally attached to the urging plate 26, the cushion member being formed by an elastomeric mat of foamed polyurethane, polystyrene, polyethylene, vinyl chloride, nitrile rubber or other bubbled material. By means of the cushion member 35, a three-dimensional original having a predetermined thickness may be urged against the glass plate 36 with a sufficient pressure force. Inwardly of one side of the original urging plate 26, a plate 37 is secured by screws 38. The plate 37 is secured to the mounting seat 27 by means of bearing 39 for pivotal movement about a pivot 40. In addition to the pivot 40, the mounting seat 27 is provided with a pivotable leg 42 pivotable about a pivot 41, the pivotable leg 42 lying at a point in a plane substantially parallel to the pivot 40 and slightly above and adjacent to the glass plate 36. Depending on the set position of the pivot 41, the gravity of the urging plate as well as the force of a coil spring to be described may act on the surface of an original when held down. A guide shaft 43 and a spring seat 44 are further secured to the pivotable leg 42, and a slidable spring seat 45 is movably fitted on the guide shaft 43 at the forward end thereof. A horizontally extending pin 46 is embedded in the spring seat 45, and a compressed coil spring 48 is disposed between the spring seats 44 and 45 such that the opposite ends of the pin 46 are engaged with the forward hooked portion 47 of the plate 37. FIG. 8 is a cross-section taken along line 8—8 in FIG. 9. With the mounting mechanism of the above-described construction, when the original urging plate 26 is in its closed position as shown in FIG. 8, the pivotable leg 42 has its base leg portion 49 in abutment with the mounting seat 27, while the coil spring 48 is compressed substantially to its minimum length by and between the spring seats 44 and 45. On the other hand, the original urging plate 26 is subjected to a counter-clockwise moment about the pivot 40 by the gravity of the plate 26 and the resilient force of the coil spring 48, thereby firmly urging an original (not shown) against the glass plate 36.

Figure 10:
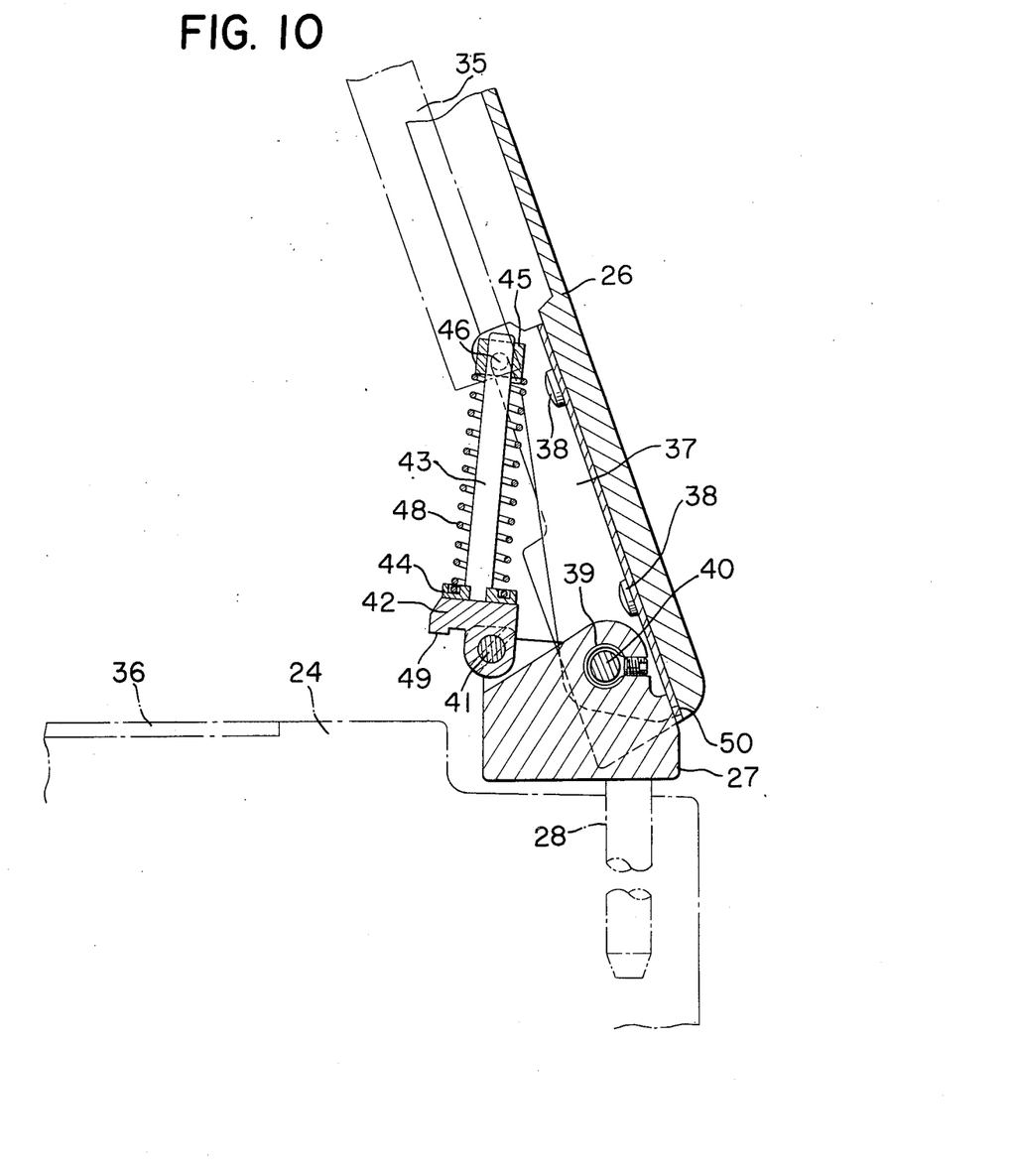

Description will now be made of the operation involved when the urging plate 26 is raised to place or replace an original. When the urging plate 26 is raised, the forward end of the guide shaft 43 is clockwisely rotated by the forward hooked portion 47 of the plate 37 and the pin 46 of the spring seat 45 and simultaneously therewith, the pivotable leg 42 is also rotated clockwisely. With the rotation of the guide shaft 43, the slidable spring seat 45 is moved toward the forward end of the guide shaft 43 to thereby increase the length of the spring 48. When the opening angle between the original urging plate 26 and the glass plate 36 exceeds a predetermined angle, the clockwise moment resulting from the resilient force of the coil spring 48 overcomes the counter-clockwise moment resulting from the gravity of the urging plate 26, with a result that the urging plate 26 automatically rises. The urging plate 26 stops rising when the rear end 50 of the plate 37 comes into abuttment with the back 51 of the mounting seat 27. Such position is shown in FIG. 10. In this position, placement or replacement of an original may take place and, since the urging plate 26 is stationary in the position of FIG. 10, the operator can use his right hand and further, the urging plate 26 is stationary within 90°, so that the urging plate 26 is readily accessible when this plate is to be brought back to its initial position.

Figure 11:
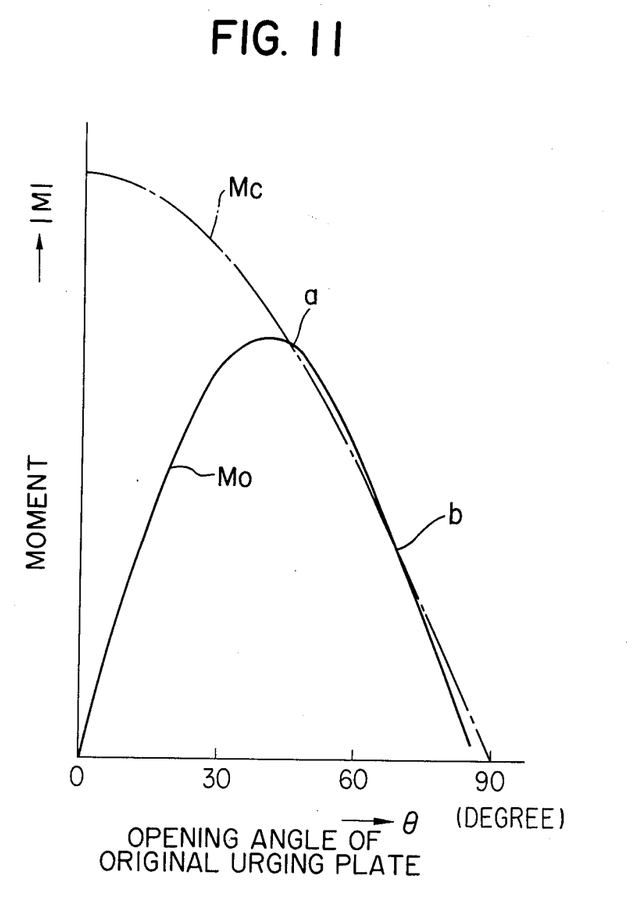
FIGS. 11 and 12 graphically illustrate the relationship between the opening angle of the original urging plate and the moments of force related thereto.

The stationary position of the urging plate, when opened, is determined by selecting the strength of the coil spring 48 in relation to the weight of the urging plate 26 and thereby balancing the clockwise and the counter-clockwise moment with each other. More specifically, the stationary position of the urging plate 26 may be within a predetermined range of angles less than a maximum opening angle of 90° which facilitates the handling of the urging plate. This could be ascertained empirically and will further be described by reference to FIGS. 11 and 12. FIG. 11 is a graph illustrating the relationship between the opening angle $\theta$ of the original urging plate and the moments. Curve $Mc$ represents the moment with which the original urging plate tends to close from its own gravity, and appears as a function of $\cos \theta$. Curve $Mo$ represents the moment from the spring force which tends to raise the urging plate, and depicts a curve similar to a parabolic curve in the graph. In the graph, it is seen that when the moment $Mo$ exceeds the moment $Mc$, the spring force overcomes the gravity of the urging plate and can raise the plate. In other words, the urging plate can become stationary at any point within the range defined by the two points $a$ and $b$ in the graph.

Figures 12, 15:
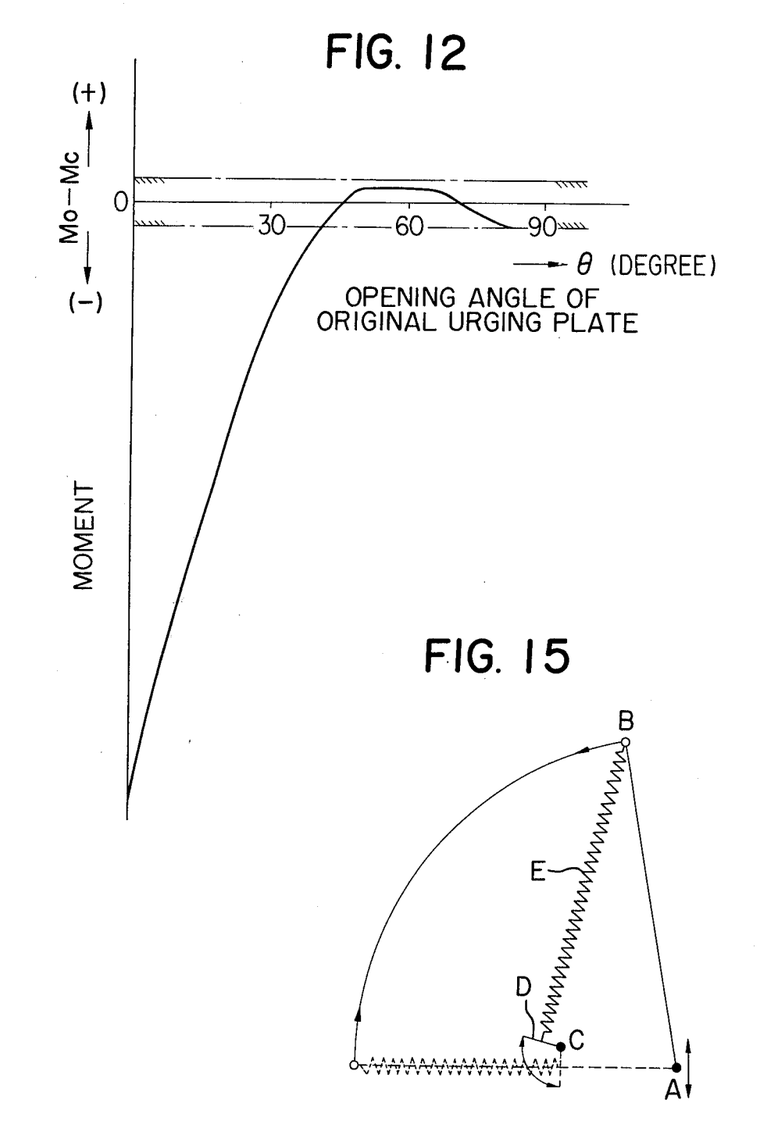
FIG. 15 diagrammatically illustrates the urging device of the present invention.

FIG. 12 is a graph illustrating the relationship between the sum of the two moments and the opening angle. Only within the range of $Mo - Mc > 0$, the original urging plate can rise without being manually aided. As shown, the curve $Mo - Mc$ has a substantially flat range at the top thereof and, by designing the spring such that this range equals 0 ($Mc - Mc = 0$), it will be possible to make the urging plate become stationary at any point within the opening angle of the urging plate which pertains to such range. Of course, it will become possible to adjust the range of stationary position for increase or decrease as desired, by suitable setting the value range of the friction moment $\pm Mf$ resulting from the mounting mechanism of FIG. 8.

In the mechanism having the values as shown in FIGS. 11 and 12, the urging plate could become stationary at any angle within the range of about 40° to the maximum opening angle 90°.

Figure 13:
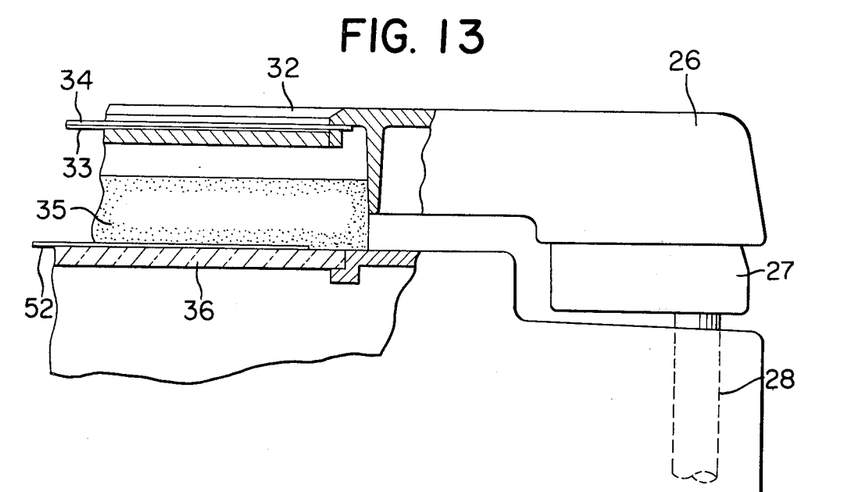
FIGS. 13 and 14 are fragmentary cross-sectional views of the urging plate of the present invention with an original placed thereon.
Figure 14:
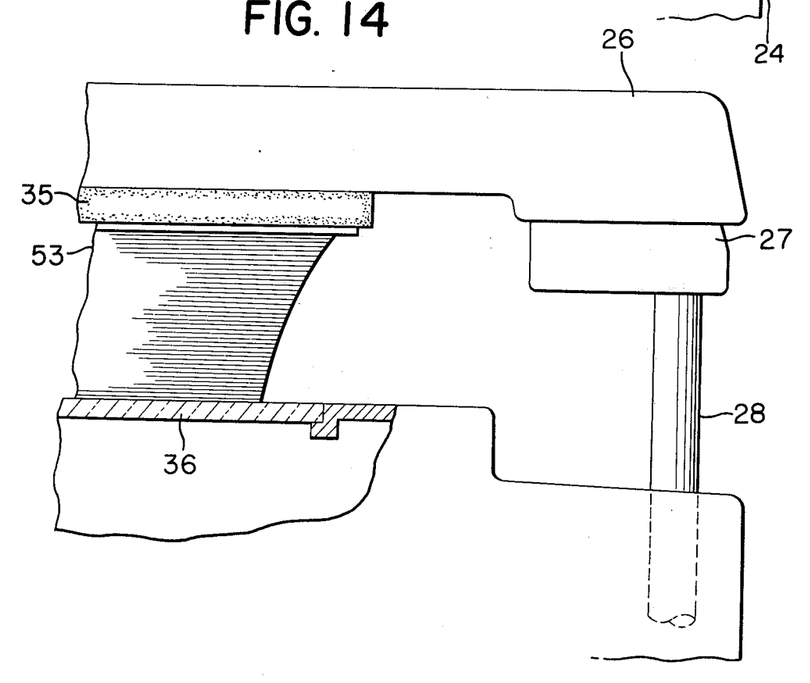

Reference is now had to FIGS. 13 and 14 to describe the condition in which an original is actually held down by the urging plate of the present invention. First, hold-down of a sheet-like original will be discussed by reference to FIG. 13 which is a fragmentary cross-sectional view of the original holding portion of the urging plate 26. Designated by 52 is a sheet-like original which, in this case, is well urged against the glass plate 36 by the cushion member 35 of the urging plate 26. Next, hold-down of a three-dimensional original will be described by reference to FIG. 14. Designated by 53 is an example of the three-dimensional original which is shown there as a book. Where the original is a thick one like this, the hold by the cushion member 35 alone is limited and the entire urging device 25 may float up to urge the original in the manner as shown. The floating mechanism for the device 25 has already been described in connection with FIG. 7 and by that mechanism, the device 25 may be returned to its position of FIG. 10 with the urging plate 26 remaining open. If the floating mechanism is designed as shown in FIG. 7 and the entire urging device 25 is removable from the apparatus body, then the copying of voluminous three-dimensional originals will become easy as well as the use of accessories for overlays or the like. Further, the entire area of the original supporting surface can be used without being interfered with by the urging device and this is effective for the copying of widely dimensioned originals, as well.

The above-described embodiment of the present invention is diagrammatically depicted in FIG. 15, where point A corresponds to the pivot 40 of the original urging plate, point B corresponds to the point of engagement between the pin 46 and the hooked portion 47 of the plate 37, and point C corresponds to the pivot 41. The straight line passing through the points A and B represents the plate 37, namely, corresponds to the original urging plate 26; the member D pivotable about the point C corresponds to the pivotable leg 42; and the spring E between the member D and the point B corresponds to the coil spring 48. In the present invention, the point A may be either fixed on the apparatus body or provided with some degree of vertical freedom as in the shown embodiment to thereby increase the range of application of three-dimensional originals. In the embodiment illustrated above, an urging plate comprising a combination of an original urging plate 26 and a cushion member 35 has been shown by way of example, whereas a similar effect may be achieved by combining the mechanism of the present invention with an urging plate of flexible material and original support means for supporting the urging plate.

The present invention, as hitherto described, enables the urging plate to become stationary within a predetermined range of angles which facilitates the handling of the urging plate. Thus, the opening angle of the urging plate may be selected to an angle at which the plate is ready to operate. In other words, the urging plate need not be raised to any excess angle, thus enhancing the operability. Also, when an original is to be held down, it can be urged against the original supporting surface not only the gravity of the urging plate but also by a resilient force acting on the surface of the original which results from displacemnt of a shaft to which one end of a resilient member is secured. Thus, the original can be brought into uniformly intimate contact with the original supporting surface.

The original urging device of the present invention is of course applicable to both the apparatus of the movable original supporting carriage type and the apparatus of the stationary original supporting carriage type, and applications of the invention include the conventional electrophotographic copying machines as well as the printing or recording machines in which an original image is projected upon an intermediate medium to provide a master.

What we claim is:

1. An original urging device comprising:
    a first supporting member pivotable about a first pivot;
    a second supporting member pivotable about a second pivot which is located at a position spaced from said first pivot;
    a sliding member slidable along said second supporting member and engaging a part of said first supporting member;
    a resilient member for biasing the sliding member in a predetermined direction;
    an original urging member mounted to said first supporting member;
    said first supporting member, second supporting member, sliding member and resilient member cooperating to enable said original urging means to take a first position urging an original against an imaging surface, and a second position in which said first supporting member and said original imaging member are spaced from the imaging surface to permit placement of an original on said surface, wherein the weight of the original urging member is opposite in direction to and balanced against a moment about the first pivot in response to the force of said resilient member, thus maintaining the original urging member at a spaced position.

2. A device according to claim 1, wherein the second pivot is displaceable to exert a force of the resilient member on the original in addition to the weight of the original urging member, when said original urging member is at its first position.

3. A device according to claim 1, wherein said first pivot is displaceable perpendicularly with respect to the imaging surface.

4. A device according to claim 1, wherein an end of said first supporting member is detachably mounted with respect to a machine to which said device is mounted.

5. A device according to claim 1, wherein said resilient member is a spring.

* * * * *

UNITED STATES PATENT OFFICE
CERTIFICATE OF CORRECTION

Patent No. 4,124,296            Dated November 7, 1978

Inventor(s) HIROTOSHI KISHI, ET AL

It is certified that error appears in the above-identified patent and that said Letters Patent are hereby corrected as shown below:

Column 2, line 30     Change "expense" to --expanse--;

6, line 18     Change "0(Mc - Mc = 0)" to

--0(Mo - Mc = 0)--.

Signed and Sealed this

*Fifteenth* Day of *May 1979*

[SEAL]

*Attest:*

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,124,296
DATED : November 7, 1978
INVENTOR(S) : HIROTOSHI KISHI, ET AL.

It is certified that error appears in the above–identified patent and that said Letters Patent are hereby corrected as shown below:

Column 8

Lines 18 and 19, change "original imaging" to

--original urging--.

Signed and Sealed this

Sixth Day of April 1982

[SEAL]

Attest:

GERALD J. MOSSINGHOFF

Attesting Officer    Commissioner of Patents and Trademarks